United States Patent [19]

Bavaro

[11] Patent Number: 4,727,291
[45] Date of Patent: Feb. 23, 1988

[54] BACK-UP ELECTRICAL SYSTEM FOR LAMPS

[75] Inventor: Joseph P. Bavaro, Saugus, Mass.

[73] Assignee: Bavco Manufacturing Co., Saugus, Mass.

[21] Appl. No.: 933,266

[22] Filed: Nov. 18, 1986

Related U.S. Application Data

[63] Continuation-in-part of Ser. No. 787,611, Oct. 15, 1985, abandoned.

[51] Int. Cl.$^4$ ............................................. H056 37/00
[52] U.S. Cl. ......................................... 315/86; 362/20
[58] Field of Search ............................. 315/86; 362/20

[56] References Cited

U.S. PATENT DOCUMENTS

| | | | |
|---|---|---|---|
| 2,067,653 | 1/1937 | Witmer et al. | 315/86 |
| 3,486,068 | 12/1969 | Dunn et al. | 315/86 |
| 3,659,179 | 4/1972 | Barker et al. | 315/87 |
| 3,684,891 | 8/1972 | Sieron | 315/86 |
| 4,057,750 | 11/1977 | Elms et al. | 315/86 |
| 4,297,614 | 10/1981 | Chandler | 315/86 |
| 4,349,863 | 9/1982 | Petersen | 315/86 |

FOREIGN PATENT DOCUMENTS 2267675 11/1975 France .

Primary Examiner—Harold Dixon
Attorney, Agent, or Firm—Wolf, Greenfield & Sacks

[57] ABSTRACT

A backup power system is provided for fluorescent lamps which energizes one of the lamps when normal A.C. mains power is not available. The circuit operates with a standard fluorescent fixture which contains two or more fluorescent lamps. When A.C. mains current is available, both lamps are operational so that the lighting fixture produces a maximum brightness. The A.C. mains current also trickle charges a low-voltage battery contained in the lighting fixture. When mains current is not available, the battery maintains only one of the lamps lighted. Consequently, although the lighting fixture produces a reduced output, the battery life is extended. In one embodiment both fluorescent lamps are powered directly from the AC line. When A.C. power is not available, a relay disconnects the A.C. line from both lamps and connects one lamp to a DC/AC inverter which is powered by the internal battery. In another embodiment, one lamp is powered directly from the AC line and the other lamp is powered by a DC/AC inverter which receives power either from a DC power supply operating off the A.C. line or from the internal low-voltage battery. In a third embodiment, during normal operating conditions, both lamps are powered by separate DC/AC inverters driven from a power supply that operates off the AC line. When the A.C. voltage is not present, the DC/AC inverter for one lamp is powered by the internal low-voltage battery.

15 Claims, 6 Drawing Figures

BACK-UP ELECTRICAL SYSTEM FOR LAMPS

This application is a continuation-in-part of application Ser. No. 787,611, filed Oct. 15, 1985 now abandoned.

BACKGROUND OF THE INVENTION

1. Field of the Invention

This invention relates to a back-up system for lamps, particularly an electrical back-up system for ballast powered lamps.

2. The Prior Art

Attempts have been made in the prior art to provide emergency or back-up lighting where the normal lighting is supplied by fluorescent lamps and the normal power is alternating current from a commercial utility source.

Examples of such attempts are U.S. Pat. Nos. 4,454,452 to Feldstein (1984) and 4,486,689 to Davis (1984). Both these references teach the use of a hard-to-find emergency lamp in place of a regular fluorescent lamp in which a considerable portion of the lamp tube is taken up by self-contained components such as a battery package and an electrical sensing and switching assembly, leaving but a portion of the tube to house a reduced sized lamp or a series of even smaller lights with consequent diminished lighting power.

These emergency lamps moreover run off a regular ballast which power one or more regularly used lamps, which ballast can burn out i.e. the emergency or standby lamp does not have its own standby ballast.

Accordingly, there is a need and market for an emergency or standby lighting system which employs easy-to-find standard sized ballast-powered lamps and which substantially overcomes the above prior art shortcomings.

There has now been developed a back-up lighting system for ballast-powered lamps which employs standard available lamps and one or more standby ballasts in full scale, back-up lighting.

By "ballast-powered" lamps, as used herein, is meant fluorescent lamps, mercury vapor lamps or high-pressure sodium lamps.

SUMMARY

Broadly, the present invention provides a backup power system for two or more fluorescent lamps in which several lamps are lighted during normal operating conditions when AC line power is present. When AC power is not present, only one lamp is lighted by means of an internal battery-driven, high-frequency DC/AC inverter. The high-frequency inverter operates one lamp with high efficiency thereby extending battery life and reducing heat buildup which can damage the internal battery.

In one embodiment of the invention, one or more lamps are powered by the AC line current through a standard A.C. line ballast. Another lamp is connected through relay contacts to the ballast so that when the A.C. line current is available, the lamp is powered by the AC line current. When the AC line current is removed, the relay releases and connects the other lamp to a DC/AC inverter which is in turn driven by a low voltage DC battery located in the lamp fixture.

In another embodiment of the invention, one or more fluorescent lamps is driven by a standard A.C. line ballast as in the previous embodiment. However, the other "emergency" lamp is driven by high-frequency A.C. current from a DC/AC inverter which is, in turn, operated from a low-voltage power supply powered from the A.C. line current. When the A.C. line current disappears, an A.C. line voltage sensor connects a low voltage internal battery to the DC/AC inverter which continues to power the emergency fluorescent lamp.

In yet a third embodiment, all of the lamps are powered from high-frequency A.C. current from DC/AC inverters. The inverters are, in turn, driven by a low-voltage rectified power supply which is operates off the A.C. line voltage. As with the previous embodiment, during an emergency situation, a line voltage sensor connects the internal battery to one of the DC/AC converters to power one lamp.

BRIEF DESCRIPTION OF THE DRAWINGS

The invention will become more apparent from the following detailed specification and drawings in which.

DESCRIPTION OF PREFERRED EMBODIMENT

Figure 1:
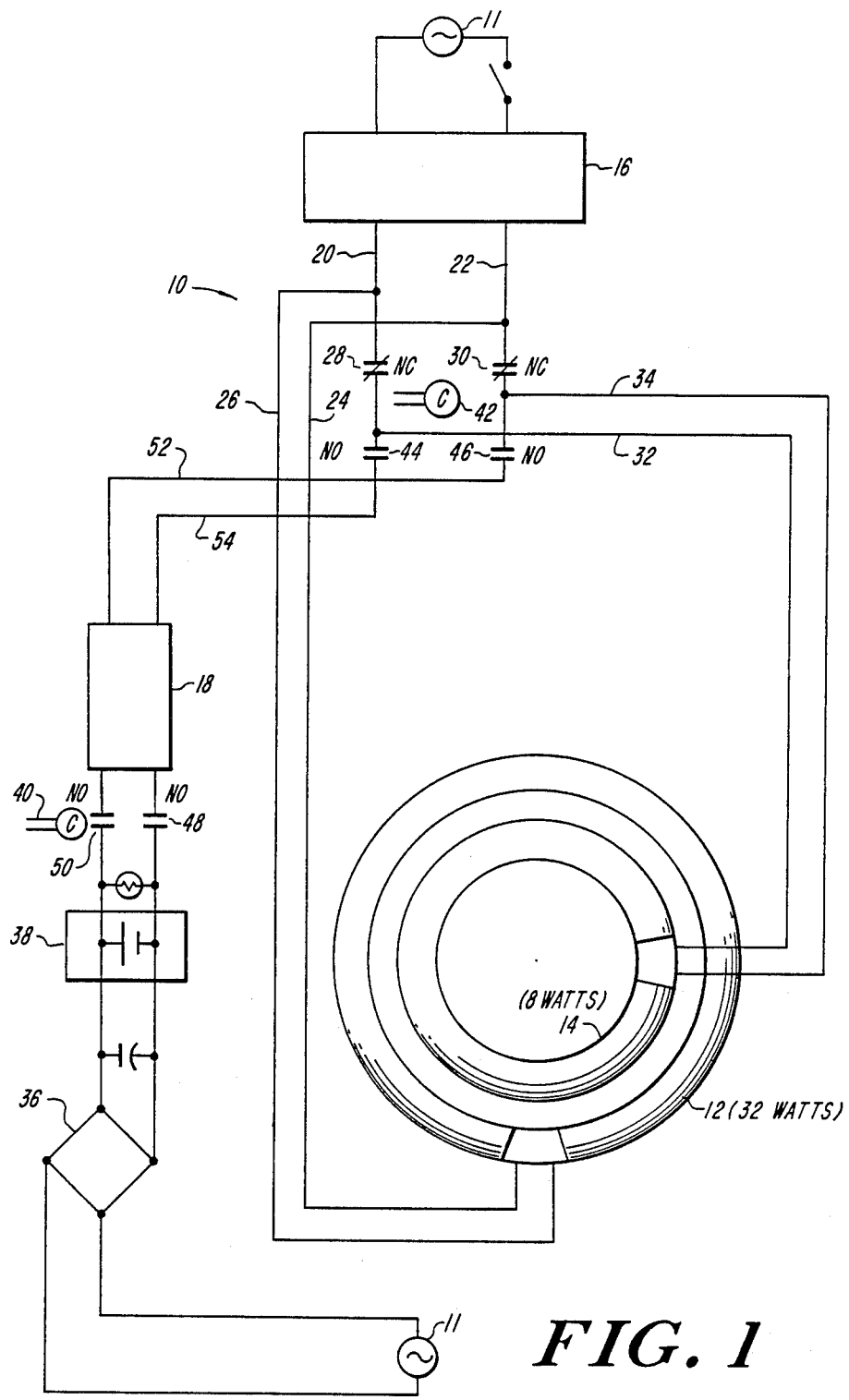
FIG. 1 is a schematic diagram of a back-up power system for fluorescent lamps with an AC power supply and with a back-up D/C power source, embodying the invention.

Referring in more detail to the drawings, the lighting fixture 10 includes a pair of circle fluorescent lamps in which the outer circle lamp 12 draws 32 watts and the inner circle lamp 14 draws 8 watts, as shown in FIG. 1. A regular ballast 16 drives the two circle lamps, powered by 115 volts AC, while a D.C./A.C. inverter 18 powers the inner circle lamp 14 in the event of interruption of the 115 volts AC, as indicated in FIG. 1. DC/AC inverter 18 is a conventional and well-known device which converts low-voltage D.C. power into A.C. power. It may illustratively consist of a one transistor or two transistor blocking or relaxation oscillator or other similar oscillating circuit. The oscillating circuit operates from a low voltage D.C. power source and drives a step-up transformer to increase the low voltage to a suitable higher voltage value to drive the fluorescent lamps. Advantageously, the oscillation frequency is relatively high (15-30 KHz) which high frequency allows the fluorescent lamps to operate efficiently, thereby reducing heat buildup.

More specifically, the circuitry is connected as follows: 115 volts AC from power supply 11 is applied to the regular ballast 16, which outputs a signal on conductors 20 and 22 & 24 and 26 to illuminate circle lamp 12, while outputting a signal across normally closed switches 28 and 30 and conductors 32 and 34, to illuminate inner circle lamp 14, as shown or indicated in FIG. 1. At the same time 115 volts AC is applied across a trickle charger 36 to apply 12 volts DC to charge back-up battery 38, as indicated by monitor light 13, as shown in FIG. 1. The charger 36 includes a transformer connected to a bridge diode, as indicated in FIG. 1.

When the 115 volt AC power supply goes down, coil relays 40 and 42 depower, causing normally closed switches 28 and 30 to open and normally open switches 44 and 46 & 48 and 50 to close, whereupon the battery 38 delivers 12 volts DC to the DC/AC inverter 18, which outputs a high-frequency A.C. signal on conductors 52 and 54 & 32 and 34 to illuminate the circle 14, to provide a battery-powered back-up lamp for several hours.

When the power supply is restored, the relay coils 40 and 42 are again energized, closing normally closed switches 28 and 30 and opening normally open switches 44 and 46, 48 and 50 to power the two circle lamps 14 and 12 by the regular 115 volts AC power supply while disconnecting the DC/AC inverter 18 and reapplying a charging voltage to the battery 38 as before, as shown or indicated in FIG. 1.

A similar push-to-test button can be connected across conductors 20 and 22 and across the conductors of the coils of relay switches 28 and 30 & 44 and 46 & 48 and 50 to simulate the discontinuance of the AC house current and connect the battery 38 to the DC/AC inverter 18 and the DC/AC inverter 18 in turn, to the standby circle lamp 14 to illuminate such lamp on a test basis per FIG. 1.

Accordingly, when the power supply or house current is interrupted: in the case of FIG. 1; the outer circle lamp goes out but the inner circle lamp continues to be illuminated by battery power providing emergency lighting for several hours.

The back-up power system of the invention applies to one or more lamps which can be straight or circular, as desired. That is, one lamp can be employed in the circular embodiment shown in FIG. 1 e.g. by removing circle lamp 12 therefrom and by employing the 8 watt circle lamp shown in FIG. 1, or replacing it with a lamp, either circular or straight of different wattage, as desired.

Preferably however, two or more lamps are employed in the back-up power system embodying the invention.

The back-up or standby lamp can be of any desired wattage. However, the lower the wattage, the longer it can be illuminated by a 12 volt battery. For example, a 32 watt lamp powered by such battery will give illumination for about one and one half hours, while an 8 watt lamp will give illumination for about four hours on such battery.

The back-up power systems of the invention can illuminate various types of lamps such as fluorescent lamps, mercury vapor lamps and high pressure sodium lamps. The only change required for such various circuits is in the ratings of the components employed in the power systems of the invention e.g. the ballast for a fluorescent lamp differs in rating from that of the mercury vapor and high pressure sodium lamps and can be replaced accordingly, but the respective circuits of the invention e.g. as shown in FIG. 1 apply per the invention.

Moreover, the back-up power systems embodying the invention can be employed with an on-off timer or a manual switch per the invention as long as the respective relay coils and battery chargers are supplied with constant AC power when such timer or manual switch turns off the lamps, to prevent false triggering of the standby circuit and lamps.

Figure 2:
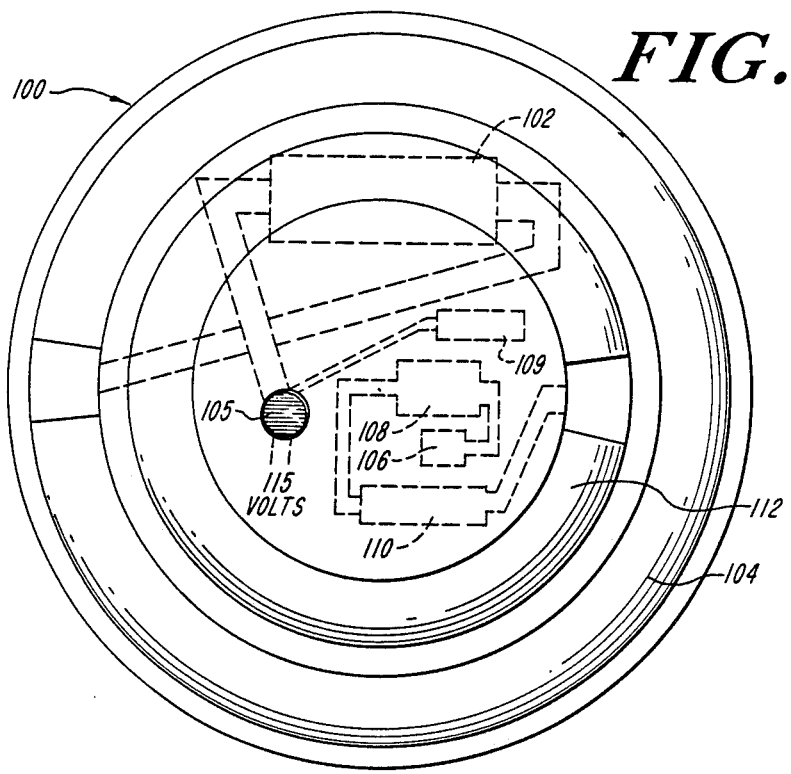
FIG. 2 is a bottom plan view of the physical layout of the components of the back-up power system for fluorescent lamps as shown in FIG. 1.

An example of the compact layout of the embodiment of the invention of FIG. 1 as shown in FIG. 2. Thus, back-up lamp system housing 100 supports a regular ballast 102, e.g. a 32 watt circular lamp 104 and a push-to-test, line AC voltage interrupter switch 105, as shown in FIG. 1. In addition, the housing 100 supports a battery charger 106, a battery 108, an N/O relay switch 109, a DC/AC inverter 110 and e.g. an 8 watt circular lamp 112 per FIG. 2.

Thus, compact units of the back-up lamp systems of the invention can be readily mounted in various rooms of a building, including windowless rooms thereof.

Figure 3:
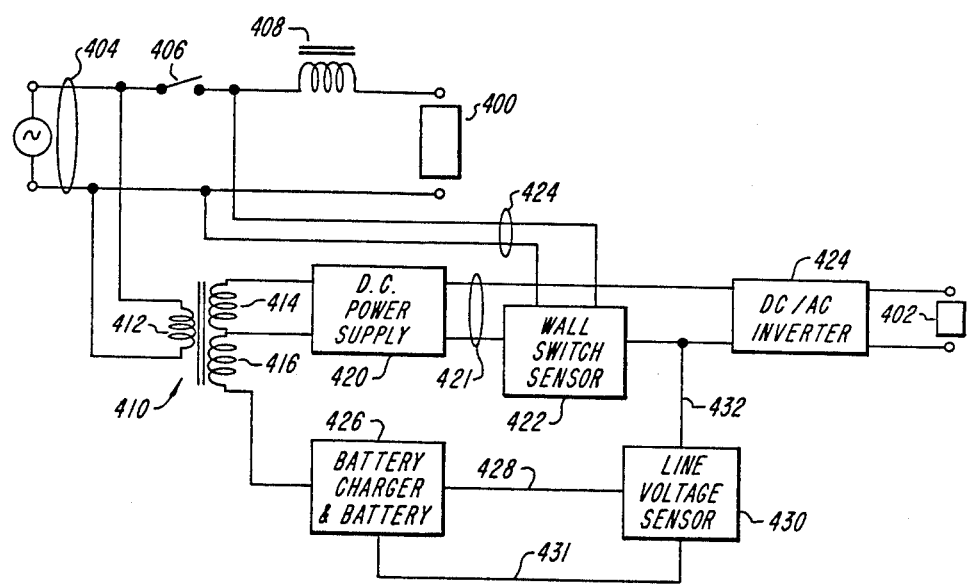
FIG. 3 is an electrical schematic diagram of a two-lamp embodiment of the invention in which one fluorescent lamp is powered from a standard AC line ballast while the second fluorescent lamp is powered from a DC/AC inverter.

FIG. 3 shows an additional embodiment of the invention in which two fluorescent lamps (shown schematically as lamps 400 and 402) are provided in one fixture. During normal operation, when A.C. line power is available, both lamps receive power from A.C. line 404. More specifically, A.C. line 404 is connected through a conventional wall switch 406 to a standard A.C. line ballast, 408, which, in turn, powers fluorescent lamp 400.

A.C. line 404 is also connected to primary winding 412 of an isolation/step-down transformer 410. Transformer 410 has a tapped secondary winding 418 consisting of two sections 414 and 416. Section 414 supplies A.C. power to a conventional low-voltage D.C. power supply 420. Power supply 420 (shown in detail in FIG. 6) may illustratively consist of a simple bridge rectifier and filtering circuit or may include a voltage limiter and regulator of well-known design. A typical D.C. power supply 420 would receive an alternating current voltage of approximately 15–20 volts A.C. from winding 414 and produce a low-voltage (for example, 12 volts) D.C. output across output leads 421.

The DC voltage on leads 421 is applied to wall switch sensing unit 422. Unit 422 is connected in series with wall switch 406 across A.C. line 404 by sensing leads 424. When wall switch 406 is closed, the A.C. line voltage appears across leads 424, which voltage is detected by unit 422. Unit 422 thereupon connects the output of D.C. power supply 420 to inverter unit 424.

Inverter 424 is a standard DC/AC inverter which, as discussed above, may consist of a conventional oscillator and transformer circuit. When D.C. power is applied to such a circuit, it oscillates at high-frequency and produces a high frequency A.C. output at a voltage suitable to operate a fluorescent lamp. The high-frequency A.C. output is applied to a second fluorescent lamp 402.

Thus, during normal operation, lamp 401 is lighted from directly from A.C. line 404 via line ballast 408 and fluorescent lamp 402 is driven by DC/AC inverter 424 which, in turn, receives D.C. power from power supply 420. Since both lights are on, the fixture produces maximum brightness.

Figure 6:
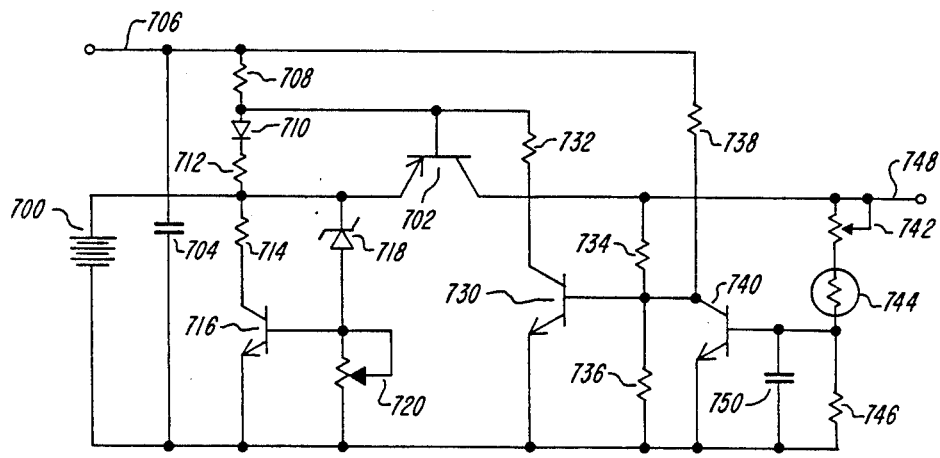
FIG. 6 is a more detailed electrical schematic diagram of the battery charging circuit and the line voltage sensor used in certain embodiments of the present invention.

In addition, during the normal operating cycle, a second section 416 of secondary winding 418 of transformer 410 is connected to battery charge circuit 426. Circuit 426 contains a conventional low-voltage power supply which generates a low-voltage trickle-charge current. This circuit may be as simple as a bridge rectifier without output filtering or may optionally include well-known regulation circuits. Conventional battery charging circuits also include current limiting and overcharge protection circuit. An illustrative battery charging circuit is shown in FIG. 6 and will be described further herein.

The output of the battery charger circuit is applied to a small low-voltage alkaline or gelatine-cell battery. Such a battery is small enough to be mounted entirely within the fluorescent fixture. However, because the battery output voltage is converted into high-frequency A.C. by inverter circuit 424, even a small battery is sufficient to drive lamp 402 for at least one and one-half hours because lamp 402 operates efficiently at high-frequencies.

The battery output on lead 428 is applied to a line voltage sensing circuit 430. This circuit (described in detail in connection with FIG. 6) disconnects the battery output 428 from the input of the inverter circuit 424 during normal conditions when A.C. line voltage is present. Circuit 430 checks for the presence of A.C. line voltage by monitoring the D.C. battery-charging voltage produced by the battery charger 426. Since battery charger 326 operates from A.C. line 404, via transformer 410, the presence of the battery charging voltage indicates that the A.C. line voltage is present.

During emergency situation, when the A.C. line voltage (and, consequently, the D.C. battery charging voltage) disappears, line voltage sensing circuit 430 connects the battery output 428 from the internal battery 426 through lead 432 to inverter 424. Thus, the battery in circuit 426 drives the inverter in place of the power supply 420. Thus, lamp 402 remains lighted. Lamp 400, of course, which operates through the standard line ballast 408 is not lighted in emergency situation. Advantageously, since only on lamp is lighted, the current drain on the internal battery is reduced, allowing it to operate for a longer period. Battery operation is further enhanced, as previously mentioned, by the fact that the inverter circuit 424 operates at a high-frequency in a high-efficiency mode.

Figure 4:
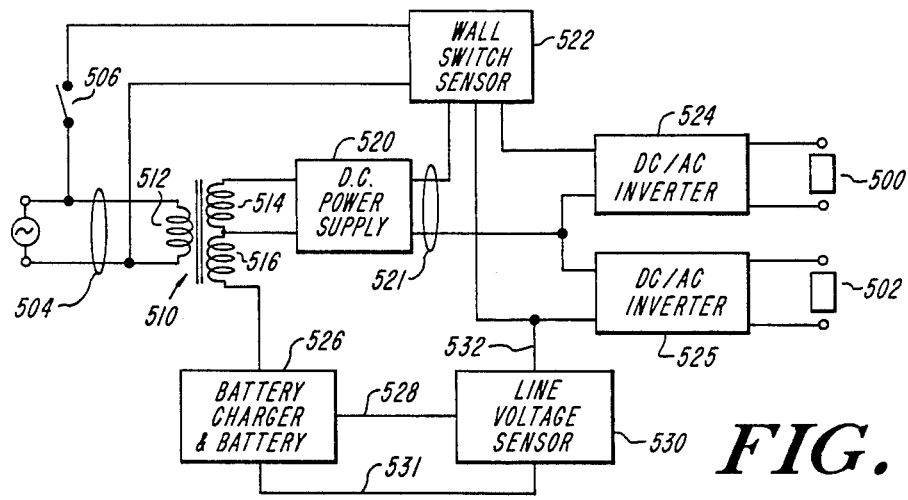
FIG. 4 is an electrical schematic diagram of a two-lamp embodiment of the invention in which both fluorescent lamps are powered by DC/AC inverters.
Figure 5:
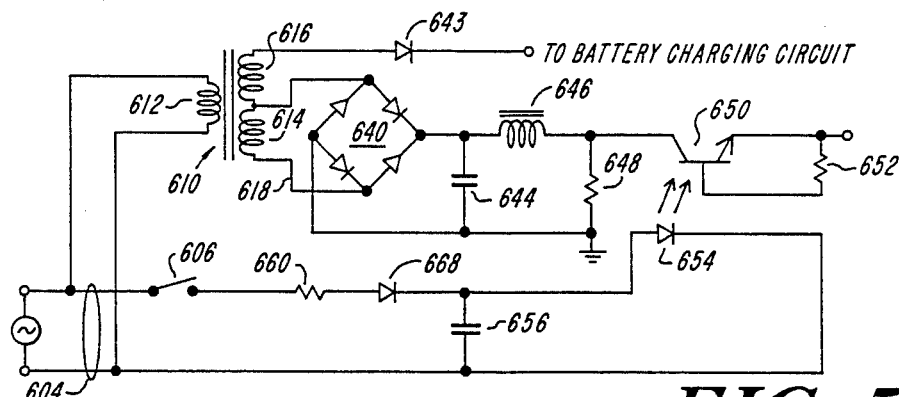
FIG. 5 is a more detailed electrical schematic diagram of the D.C. power supply and wall switch control used in certain embodiments of the present invention.

FIG. 4 shows another embodiment of the present invention which also incorporates two fluorescent lamps, 500 and 502. The circuitry in FIG. 5 is similar to that shown in FIG. 3 and the corresponding components are designated with similar numerals. As in the previous embodiment, A.C. line voltage on A.C. line 504 is provided to primary winding 512 of transformer 510. The secondary winding 518 is divided into two sections 514 and 516. Section 514 drives a low-voltage power supply, 520, and section 516 drives a battery charger which, in turn, is connected to an internal battery 526.

The output 521 of low-voltage power supply 520 is connected, via a wall switch sensing unit 522, to a pair of DC/AC inverters, 524 and 525. Thus, during normal operation, when A.C. line voltage is present, the D.C. output from power supply 520 drives both inverter 524 and 525 to light lamps 500 and 502, respectively. This embodiment has an advantage over the embodiment shown in FIG. 4 in that a standard line ballast is not used. Inverters 524 and 525 operate the lamps 500 and 502 more efficiently than a standard ballast and, thus, the heat which would be generated by a standard ballast is reduced. Since excess heat can reduce battery life time, the embodiment shown in FIG. 4 extends battery life time.

As shown in FIG. 4, the A.C. line voltage used to charge the internal 12 volt battery unit 526 is monitored by line-voltage sensing circuit 530. During an emergency situation (as discussed in the previous embodiment), the D.C. battery charging voltage on lead 531 disappears, causing line voltage sensing unit 530 to connect the battery output on lead 528, via lead 532, to inverter 525. Inverter 525 is therefore powered by the internal battery to light fluorescent lamp 502. Fluorescent lamp 500 does not receive power from either the battery or the D.C. power supply 520 (which is now disabled because of the lack of AC line voltage) and, accordingly, lamp 500 does not light. Battery power is thereby conserved.

FIG. 5 shows a more detailed electrical schematic of a wall switch sensor which utilizes an electro-optical isolator. Portions of the circuitry shown in FIG. 6 are shown in block schematic form in FIGS. 3 and 4 and those portions are designated with similar numerals in FIG. 5. In particular, the D.C. power supply (shown as element 420 in FIG. 4 and element 520 in FIG. 4) is comprised of a full-wave bridge rectifier 640 driven by the secondary winding 614 of transformer 610. The rectified DC output of bridge 640 is smoothed by a low-pass filter consisting of capacitor 644, choke 646 and resistor 648. The D.C. output of this circuitry is provided to a phototransistor 650 which, in the absence of any light, is held "off" by resistor 652.

Phototransistor 650 is operated by light-emitting diode 654 which is, in turn, controlled by wall switch 606. More particularly, when wall switch 606 is closed, the A.C. line current is rectified by means of resistor 660 and diode 658. The rectified voltage is smoothed by capacitor 656 and applied to light-emitting diode 654. Light-emitting diode 654, in turn, operates transistor 650 to connect the output of D.C. power supply 620 to the DC/AC inverters shown in FIGS. 3 and 4.

When wall switch 606 is opened, the current flow through diode 654 ceases and transistor 650 disconnects D.C. power supply from the inverters.

As shown in FIGS. 3 and 4, the voltage produced by secondary winding, 616, of transformer 610 is provided, via lead 642 and diode 643 to the battery charging circuit.

The battery charging circuit and line voltage monitor is shown in more detail in FIG. 6. In FIG. 7, the battery charging voltage (provided through diode 643 shown in FIG. 6) is filtered by capacitor 704 and applied, via resistor 706, diode 710 and resistor 712, to battery 700.

Battery 700 is prevented from overcharging by means of a voltage regulator circuit consisting of resistor 714, transistor 716, potentiometer 720 and Zener diode 718. Zener diode 718 and potentiometer 720 maintain the base of transistor 716 at a predetermined potential relative to the battery potential. If, during the charging operation, the battery voltage increases the potential at the base of transistor 716 will also increase. Transistor 716 thus begins to conduct more heavily, drawing charging current away from the battery.

During normal operation, the battery charging voltage is also applied through resistor 708 to the base of transistor 702. The emitter of transistor 702 is connected to battery 700. Since the battery charging voltage is typically higher than the battery voltage and since transistor 702 is a PNP-type transistor, transistor 702 will be back-biased during normal operation and thus transistor 702 will be held in a non-conducting state. Consequently, battery 700 will not be connected to output lead 748.

Because transistor 702 is not conducting, the voltage on lead 748 falls to ground level due to resistors 734 and 736. However, the battery charging voltage on lead 706 is applied to the base of transistors 730 by means of the voltage divider consisting of resistors 738, 736 and 734. The values of these resistors are chosen so that transistor 730 is turned-on in the normal condition.

During emergency situation, the charging voltage on lead 706 disappears, allowing transistor 706 to turn on. When transistor 702 turns on battery 700 is connected to lead 748. The voltage on lead 748 holds transistor 730 "on" via the voltage divider consisting of resistors 734 and 736. Turned-on transistors 730 grounds the base of transistor 702 via resistor 732 and maintains transistor 702 in the "on" condition.

Transistor 740 is provided with an optional photocell circuit which turns transistor 702 off (via transistor 730) if the ambient light is bright enough so that emergency lighting is not needed. In particular, the potential at the base of transistor 740 is controlled by a voltage divider consisting of potentiometer 742, photocell 744 and resistor 746. Normally, this potential is adjusted so that, during emergency situation, when battery voltage apperas on lead 748, transistor 740 will be in its non-conductive state. As the ambient light intensity increases, however, the resistance of photocell 744 decreases and the potential at the base of transistor 740 increases. Eventually, transistor 740 turns "on" and effectively grounds the base of transistor 730 which transistors, in turn, turns "off" opening the ground connection to the base of transistor 702. Transistor 702 thus disconnects battery 700 from the inverter circuits (not shown in FIG. 6) so that battery power is not wasted when emergency lighting is not needed. Capacitor 750 insures that transistors 730 and 702 turn off before transistor 740.

As is conventional, the resistive voltage divider formed by resistors 734 and 736 also monitors the battery voltage and shuts off transistor 702, via transistor 730, when the output voltage on lead 748 drops below a predetermined minimum voltage. This latter action prevents battery 700 from being severely discharged, a situation which makes recharging difficult after repeated recharges.

All of the embodiments have the advantage that the battery which powers the emergency lighting is contained within the lighting fixture. This arrangement allows easy retrofitting of the fixture without extensive rewiring. In addition to the D.C. battery and charging circuit is isolated from the A.C. line—a condition which is required to meet electrical code requirements in many locations.

What is claimed is:

1. A back-up power system for a lighting fixture which operates at least two lamps from an A.C. mains line comprising
   means for powering all of said lamps from the A.C. mains line,
   a low-voltage battery located in said fixture,
   a battery charging circuit powered from said A.C. mains line and connected to said battery for generating a battery charging current for charging said battery,
   a DC/AC inverter connected to one of said lamps, and
   means connected to said A.C. mains line and responsive to the absence of A.C. mains power for disconnecting said one lamp from said A.C. mains and for connecting said battery to said DC/AC inverter to power said one of said lamps,
   said powering means including a D.C. power supply operating from said A.C. mains line to produce a D.C. output voltage and means connecting said D.C. output voltage to said inverter to operate said one of said lamps when A.C. mains voltage is present.

2. A back-up power system according to claim 1 wherein said powering means comprises an A.C. line ballast for powering one or more lamps from said A.C. mains line.

3. A back-up power system according to claim 1 wherein said disconnecting means comprises means responsive to the absence of A.C. mains power for disconnecting said D.C. output from said DC/AC inverter.

4. A back-up power system according to claim 3 wherein said disconnecting means further comprises means responsive to the absence of said battery charging current from connecting said battery to said DC/AC inverter to power said one of said lamps.

5. A back-up power system according to claim 1 wherein said powering means comprises at least two DC/AC inverters, means for connecting said one lamp to one of said inverters and means connecting all of the remaining lamps to the other inverter.

6. A back-up power system according to claim 5 wherein said powering means further comprises a D.C. power supply operating from said A.C. mains line to produce a D.C. output voltage and means connecting said D.C output voltage to all of said inverters to operate said lamps when A.C. mains voltage is present.

7. A back-up power system according to claim 6 wherein said disconnecting means comprises means responsive to the absence of A.C. mains power for disconnecting said D.C. output from said DC/AC inverters.

8. A back-up power system according to claim 7 wherein said disconnecting means further comprises means responsive to the absence of said battery charging current for connecting said battery to one of said DC/AC inverters to power said one of said lamps.

9. A back-up power system for lamps which operate from AC house current, said back-up system comprising,
   an AC ballast connected to said AC house current,
   at least one first lamp connected to said AC ballast so that said first lamp operates from said AC house current,
   an AC relay having a coil connected to said AC house current, two N/C contacts, a first set of two N/O contacts and a second set of N/O contacts,
   at least one second lamp electrically connected in series with said N/C relay contacts to said AC ballast,
   a DC/AC inverter,
   means connecting said second lamp electrically in series with said first set of N/O relay contacts to said DC/AC inverter,
   a low-voltage battery,
   means connecting said DC/AC inverter electrically in series with second set of N/O relay contacts to said battery, so that when said AC house current is present, both said first lamp and said second lamp are operated from said AC ballast, and, when said AC house current is not present, said N/C relay contacts are opened and said N/O relay contacts are closed so that said DC/AS inverter is connected to said battery and to said second lamp whereby said second lamp is powered by said battery.

10. The back-up power system of claim 9 wherein said AC house current is 115 volts AC and said battery delivers 12 volts DC.

11. The back-up power system of claim 9 wherein said lamps are fluorescent lamps and said first lamp is rated at 8 watts and said second lamp is rated at 32 watts.

12. The back-up power system of claim 11 wherein said lamps have a rounded tubular or straight tubular shape.

13. The back-up power system of claim 12 wherein said battery has a pilot light attached thereto.

14. The back-up power system of claim 9 wherein said lamps are lamps selected from the group consisting of fluorescent lamps, mercury vapor lamps and high pressure sodium lamps.

15. The back-up power system of claim 9 wherein a battery charger is connected to AC house current and said battery to provide a DC charge to said battery.

* * * * *